United States Patent [19]
Baker

[11] Patent Number: 5,580,015
[45] Date of Patent: Dec. 3, 1996

[54] MULTIPLE RECEPTACLE ROTATING STAND

[76] Inventor: George W. Baker, P.O. box 1886, Bandera, Tex. 78003

[21] Appl. No.: 378,782

[22] Filed: Jan. 26, 1995

[51] Int. Cl.$^6$ .................................................. A47G 29/00
[52] U.S. Cl. .......................................... 248/145; 248/907
[58] Field of Search ................................. 248/146, 141, 248/417, 907, 141, 145; 211/77, 78; 220/909, 475, 23.03, 911

[56] References Cited

U.S. PATENT DOCUMENTS

| | | | |
|---|---|---|---|
| 860,019 | 7/1907 | Davis | 248/907 X |
| 2,175,134 | 10/1939 | Smith | 248/907 X |
| 2,522,036 | 9/1950 | Haake | 248/907 X |
| 2,596,541 | 5/1952 | Farquharson | 248/907 X |
| 2,937,760 | 5/1960 | Williams | 248/907 X |
| 3,130,837 | 4/1964 | Baker | 248/907 X |
| 3,527,356 | 9/1970 | Herdy . | |
| 3,642,145 | 2/1972 | Shelton | 248/907 X |
| 3,696,938 | 10/1972 | Sherman | 248/145 X |
| 3,966,052 | 6/1976 | Knaus | 248/145 X |
| 4,517,775 | 5/1985 | Engel | 248/907 X |
| 4,856,669 | 8/1989 | Averitt et al. . | |
| 5,161,561 | 11/1992 | Jamieson . | |

*Primary Examiner*—Karen J. Chotkowski
*Attorney, Agent, or Firm*—Michael I. Kroll

[57] ABSTRACT

A multiple receptacle rotating stand comprising a support post. An assembly is for anchoring a bottom end of the support post into the ground, so that the support post is in an upright position. A collar is placed onto a top end of the support post. An element is for rotating the collar about the top end of the support post. A structure extends from the collar, for supporting a plurality of trash receptacles off of the ground, to prevent prowling animals, such as dogs, from tipping over the trash receptacles and spilling trash onto the ground. The trash receptacles can also be utilized to separate the trash, such as glass, paper, metal, etc., so that the trash can be recycled. Shallow containers can also be used on the structure to feed animals, such as horses and the like.

1 Claim, 2 Drawing Sheets

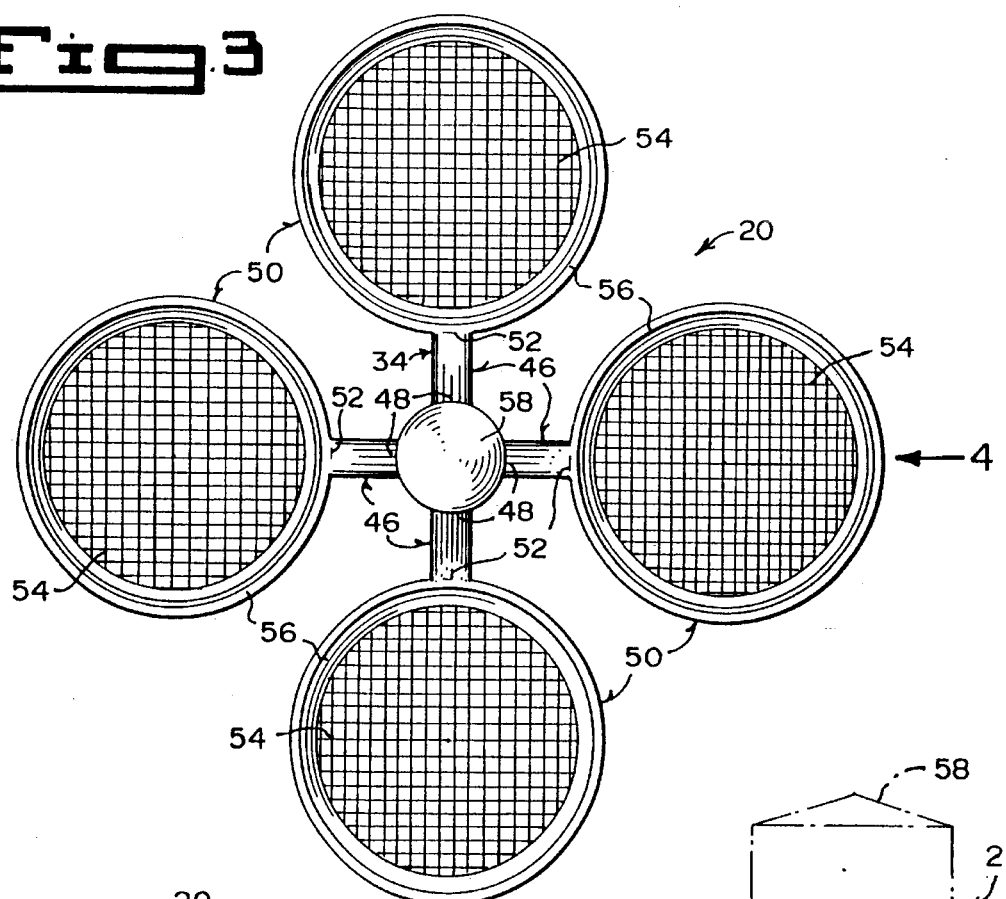
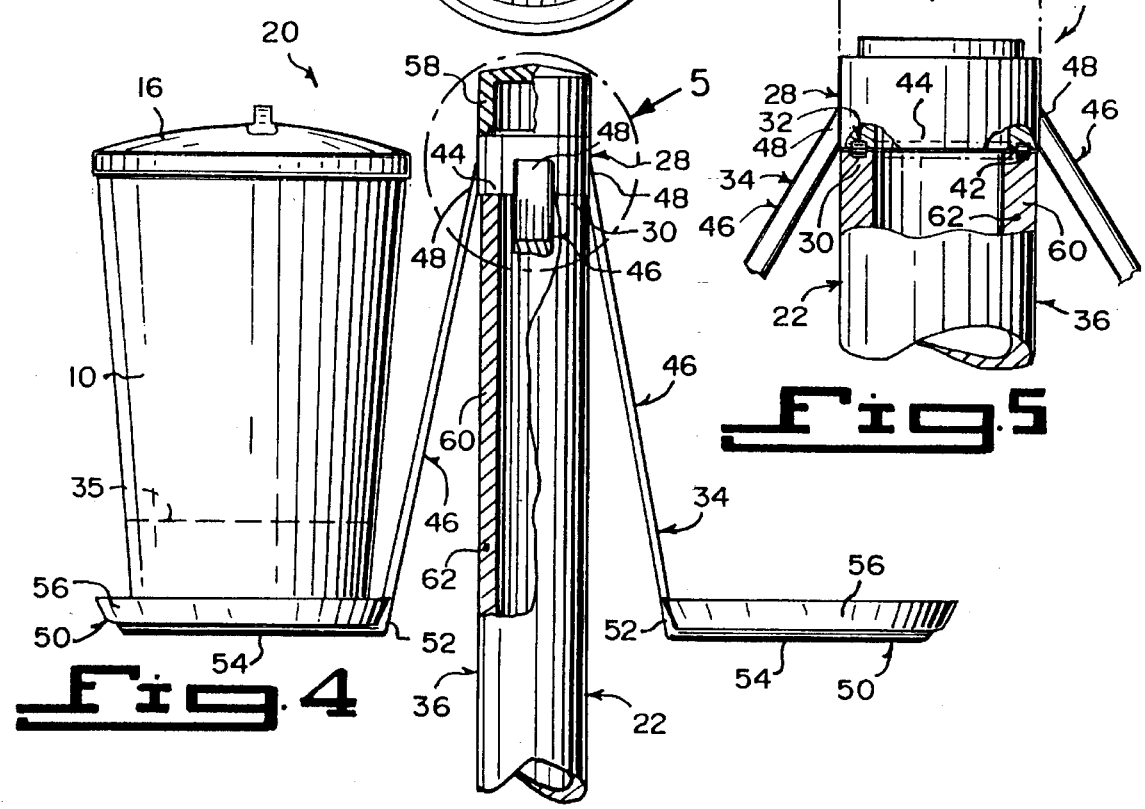

MULTIPLE RECEPTACLE ROTATING STAND

BACKGROUND OF THE INVENTION

1. Field of the Invention

The instant invention relates generally to support holders and more specifically it relates to a multiple receptacle rotating stand.

2. Description of the Prior Art

Numerous support holders have been provided in prior art. For example, U.S. Pat. Nos. 2,175,134 to Smith; 3,527,356 to Herdy; 3,642,145 to Shelton; 4,856,669 to Averitt et al. and 5,161,561 to Jamieson all are illustrative of such prior art. While these units may be suitable for the particular purpose to which they address, they would not be as suitable for the purpose of the present invention as heretofore described.

SMITH, JAMES FRED

HOLDER FOR GARBAGE CANS

U.S. Pat. No. 2,175,134

In a holder for garbage cans, a socket has a thimble. A pedestal is removably applied thereto. A plate is provided. A means is for coupling the plate and pedestal. A can is also provided that has a bottom. A means is for securing the plate to the bottom of the can. Radially extending slotted arms are movable on the last mentioned means. A means is for connecting the arms at their outer ends to the can bottom.

HERDY, JOHN B.

GARBAGE CAN RACK

U.S. Pat. No. 3,527,356

An anchor post mounts a refuse container rack. Actuator rods having a container cover mounted thereto are pivotally connected to the rack and are upwardly displaceable in response to a lifting force. The actuator rods include a latch member which is adapted to engage a keeper when actuator rods are displaced to a predetermined vertical position. Thus, refuse may be deposited in a rack supported container without the necessity of holding a lid or cover. A gentle downward force on the actuator rods causes the lid to return to a container covering position.

SHELTON, RALPH EDWARD

REFUSE CAN SUPPORT

U.S. Pat. No. 3,642,145

A support for a group of household garbage cans or the like comprises a plurality of frames normally radiating from a sleeve which is adjustable vertically on a post. Each frame is adapted to hold an individual can. Each frame is connected to the sleeve for collapsing to a depending, inoperative position when its can is removed.

AVERITT, CHESTER C.

BYRNE, THOMAS R.

REVOLVING REFUSE HOLDER

U.S. Pat. No. 4,856,669

A concave shaped rigid member whose principle axis lies in the horizontal plane and is mounted on a post lying in a vertical plane. The concave member is adaptable for holding refuse bags or the like, at a height which is adjustable to provide insusceptibility for encroachment from animals. The concave member is provided with a means of rotation and drainage.

JAMIESON, BRUCE W.

OUTDOOR SERVICE SYSTEM

U.S. Pat. No. 5,161,561

An outdoor service system is disclosed which is comprised of a segmented pole. A plurality of fixed split thrust bearing parts are mounted on the pole. A split table is mounted on a rotatable thrust bearing part, which bears upon one of the fixed thrust bearing parts. A plurality of receptacles are detachably secured to a rotatable thrust bearing part, which is borne by one of the fixed thrust bearing parts. A parasol is mounted on a rotatable thrust bearing part which is borne by another one of the fixed thrust bearing parts. The disclosed outdoor service system further includes a pointed lowermost pole segment adapted to be driven into the ground. A plurality of wings are pivotally mounted on the lowermost pole segment, whereby to prevent its withdrawal from the ground. A foot plate is further provided, to assist in the embedding of the lowermost pole segment in the ground and to resist angular deflection of the pole when its lowermost segment is fully embedded in the ground.

SUMMARY OF THE INVENTION

A primary object of the present invention is to provide a multiple receptacle rotating stand that will overcome the shortcomings of the prior art devices.

Another object is to provide a multiple receptacle rotating stand that will support a plurality of receptacles in a rotatable manner off of the ground, to prevent prowling animals, such as dogs, from tipping over the receptacles and spilling the trash onto the ground, while it can also be utilized to feed horses and to separate trash, such as glass, paper, metal, etc. so that the trash can be recycled.

An additional object is to provide a multiple receptacle rotating stand, in which the receptacles can be maintained elevated neatly in an area by a structure, which will keep contaminated trash off of the ground and away from children.

A further object is to provide a multiple receptacle rotating stand that is simple and easy to use.

A still further object is to provide a multiple receptacle rotating stand that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1 is a perspective view of the prior art, in which a dog had dumped over a trash receptacle and is eating its contents.

FIG. 2 a perspective view of the instant invention.

FIG. 3 is a top view taken in the direction of arrow 3 in FIG. 2, with the trash receptacles removed.

FIG. 4 is an elevational view taken in the direction of arrow 4 in FIG. 3, with parts broken away and in section, with one trash receptacle in position thereon.

FIG. 5 is an enlarged elevational view as indicated by arrow 5 in FIG. 4, with parts broken away in section and in phantom, showing the roller bearing therein, so that the collar will rotate upon the upright support post.

Similar reference characters denote corresponding features consistently throughout the attached drawings.

DETAILED DESCRIPTION OF THE PREFERRED EMBODIMENTS

Figure 1:
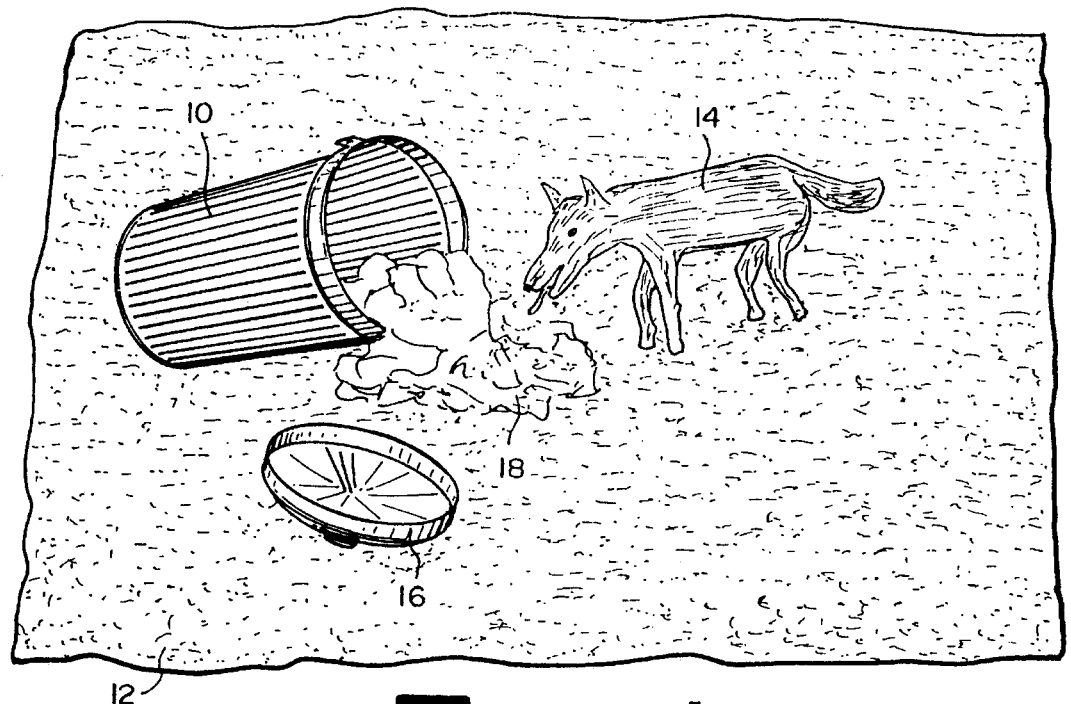
Figure 2:
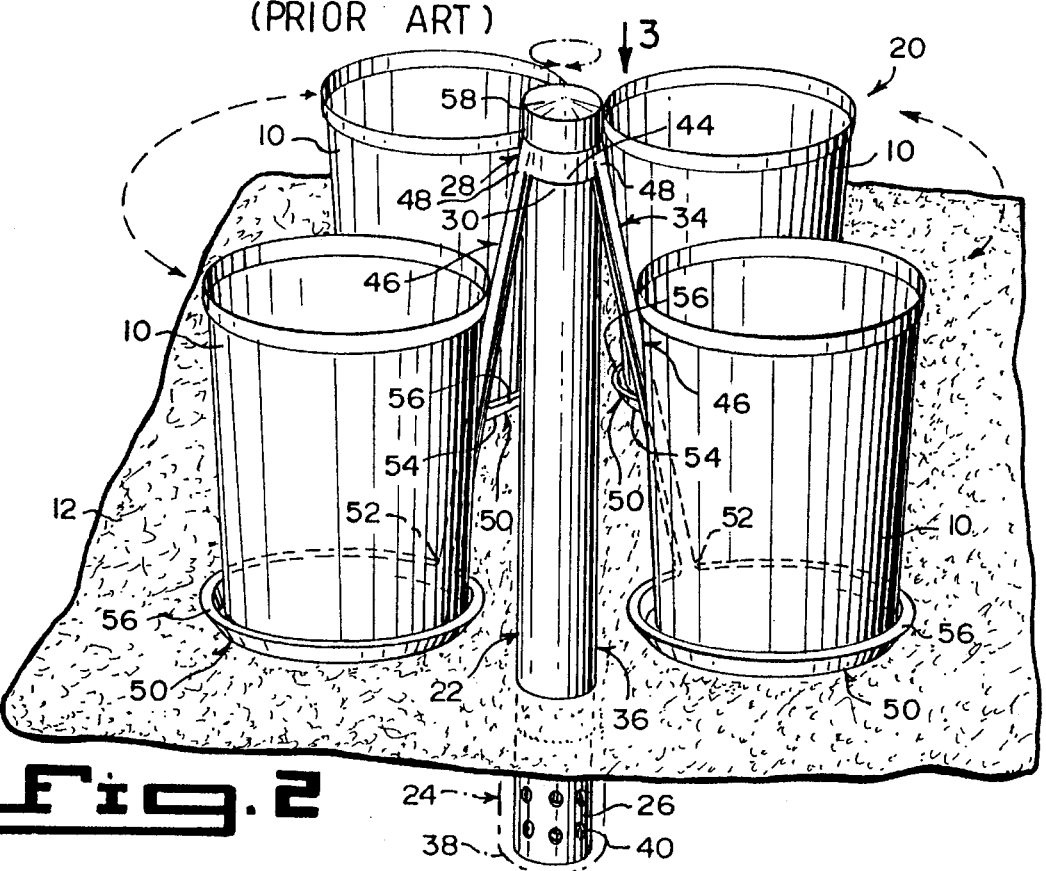

Turning now descriptively to the drawings, in which similar reference characters denote similar elements throughout the several views, FIG. 1 illustrate the prior art, which is a trash receptacle 10 tipped over onto the ground 12 by a dog 14. The cover 16 is off, so that the trash 18 is spread out therefrom with the dog 14 eating it.

The instant invention is shown in FIGS. 2 through 5, which is a multiple receptacle rotating stand 20 comprising a support post 22. An assembly 24 is for anchoring a bottom end 26 of the support post 22 into the ground 12, so that the support post 22 is in an upright position. A collar 28 is placed onto a top end 30 of the support post 22. An element 32 is for rotating the collar 28 about the top end 30 of the support post 22. A structure 34 extends from the collar 28, for supporting a plurality of trash receptacles 10 off of the ground 12, to prevent prowling animals, such as dogs 14, from tipping over the trash receptacles 10 and spilling trash 18 onto the ground 12. The trash receptacles 10 can also be utilized to separate the trash, such as glass, paper, metal, etc., so that the trash can be recycled shallow containers 35, one of which is shown in dotted in FIG. 4, can also be used on the structure 34 to feed animals, such as horses and the like.

The support post 22 is an elongated cylindrical pole 36. The anchoring assembly 24 includes a concrete footing 38 secured into the ground 12. The bottom end 26 of the elongated cylindrical pole 36 has a plurality of small apertures 40 thereabout. The bottom end 26 is embedded into the concrete footing 38. The rotating element 32 is a roller bearing 42 located between the top end 30 of the elongated cylindrical pole 36 and a bottom end 44 of the collar 28.

The structure 34 consists of a plurality of arms 46. Each arm 46 radially descends at a first end 48 from the collar 28. A plurality of circular trays 50 are provided. Each circular tray 50 is affixed to a second end 52 of one arm 46 in a horizontal position above the ground 12, so that each trash receptacle 10, or shallow container 35 will sit upon each circular tray 50.

Each circular tray 50 includes a bottom wire grid or bottom wall 54. An annular raised rim 56 is about the bottom wire grid or bottom wall 54. The multiple receptacle rotating stand 20 further contains a cap 58, which is mounted onto the collar 28. The elongated cylindrical pole 36, the collar 28, the roller bearing 42, each arm 46, each circular tray 50 and the cap 58 are all fabricated out of a strong durable material 60. The strong durable material 60 is a rust proof substance 62, typically but not limited to, stainless steel, aluminum and similar metals.

It is understood that the material forming the multiple receptacle rotating stand 20 may be of variable thicknesses, densities and types, some being polyethylene, fiberglass, or aluminum. It is further understood that different methods of fabrication of integral parts may be used such a welding, bolting, riveting, or the like. It is to be appreciated that the invention can be manufactured in different sizes suiting many different dimensions of trash receptacles 10.

OPERATION OF THE INVENTION

To use the multiple receptacle rotating stand 10, the following steps should be taken:

1. Form the concrete footing 38 into the ground 12.
2. Insert the bottom end 26 of the support post 22 having the small apertures 40 into the concrete footing 38 and let it set.
3. Place the roller bearing 42 onto the top end 30 of the support post 22.
4. Mount the collar 28 supporting the arms 46 and the circular trays 50 over the roller bearing 42.
5. Put the cap 58 onto the collar 28.
6. Position the trash receptacles 10, or shallow containers 35 on the circular trays 50.

LIST OF REFERENCE NUMBERS 10 trash receptacle
12 ground
14 dog
16 cover of 10
18 trash
20 multiple receptacle rotating stand
22 support post
24 anchoring assembly
26 bottom end of 22
28 collar
30 top end of 22
32 rotating element
34 supporting structure for 10
35 shallow container
36 elongated cylindrical pole for 22
38 concrete footing in 12
40 small aperture in 26
42 roller bearing for 32
44 bottom end of 28
46 arm
48 first end of 46
50 circular tray
52 second end of 46
54 bottom wire grid of 50
56 annular raised rim of 50
58 cap on 28
60 strong durable material 62 rustproof substance for 60

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A multiple receptacle rotating stand comprising:

a) a support post comprising an elongated cylindrical pole;

b) means for anchoring a bottom end of said support post into the ground comprising a concrete footing secured into the ground and the bottom end of said elongated cylindrical pole having a plurality of small apertures thereabout in which said bottom end is embedded into said concrete footing, so that said support post is in an upright position;

c) a collar placed onto a top end of said support post;

d) means for rotating said collar about the top end of said support post comprising a roller bearing located between the top end of said elongated cylindrical pole and a bottom end of said collar, and a cap mounted on said collar; and e) means extending from said collar for supporting a plurality of trash receptacles off of the ground, to prevent prowling animals from tipping over the trash receptacles and spilling garbage onto the ground, whereby the trash receptacles can also be utilized to separate the trash for recycling, while shallow containers can also be used on said supporting means to feed animals, said supporting means comprising a plurality of arms with each said arms radially descending outwardly at a first end from said collar and a plurality of circular trays for supporting the trash receptacles wherein said trays are each affixed to a second end of one said arm in a horizontal position above the ground spaced from and free of direct attachment to said cylindrical pole, with each said trash receptacle/shallow container sitting upon each said circular tray, each circular tray having a bottom wire grid and an annular raised rim about said wire grid.

* * * * *